(12) United States Patent
DeVerse

(10) Patent No.: US 9,943,189 B2
(45) Date of Patent: Apr. 17, 2018

(54) INFRARED TOASTING DEVICE

(71) Applicant: Hula Dog Franchise, Inc., Honolulu, HI (US)

(72) Inventor: Richard A. DeVerse, Kailua Kona, HI (US)

(73) Assignee: Hula Dog Franchise, Inc., Honolulu, HI (US)

( * ) Notice: Subject to any disclaimer, the term of this patent is extended or adjusted under 35 U.S.C. 154(b) by 163 days.

(21) Appl. No.: 14/967,195

(22) Filed: Dec. 11, 2015

(65) Prior Publication Data

US 2016/0174768 A1 Jun. 23, 2016

Related U.S. Application Data

(60) Provisional application No. 62/124,614, filed on Dec. 23, 2014.

(51) Int. Cl.
*A47J 37/08* (2006.01)

(52) U.S. Cl.
CPC ........... *A47J 37/08* (2013.01); *A47J 37/0864* (2013.01)

(58) Field of Classification Search
CPC ...... A47J 37/043; A47J 37/0688; A47J 37/08; A47J 37/0807; A47J 37/0857; A47J 37/0878
USPC ........................................ 99/385, 419, 421 V
See application file for complete search history.

(56) References Cited

U.S. PATENT DOCUMENTS

| | | | |
|---|---|---|---|
| 1,848,030 A | 3/1932 | Sibley | |
| 1,902,564 A | 3/1933 | Mabey | |
| 1,992,270 A * | 2/1935 | Wilkes | A47J 37/0864 219/242 |
| 2,239,862 A * | 4/1941 | Scalph | A47J 37/08 99/340 |
| 2,648,275 A | 8/1953 | Thompson | |
| 3,377,943 A | 4/1968 | Frank | |
| 3,635,146 A | 1/1972 | Jean-Pierre | |
| 3,965,808 A | 6/1976 | Chomette | |
| 5,039,535 A * | 8/1991 | Lang | F24C 7/087 426/233 |
| 6,192,790 B1 * | 2/2001 | Balandier | A47J 37/0807 219/521 |
| 7,339,136 B2 | 3/2008 | Schmanski | |
| 2004/0250691 A1 * | 12/2004 | Schmanski | A47J 37/0864 99/419 |
| 2005/0132900 A1 * | 6/2005 | Cavada | A47J 37/0807 99/389 |
| 2013/0022719 A1 * | 1/2013 | Barber | A47J 37/1214 426/243 |
| 2015/0144005 A1 * | 5/2015 | Becker | A47J 37/08 99/332 |
| 2016/0157673 A1 * | 6/2016 | Paille | A47J 37/049 99/331 |

* cited by examiner

*Primary Examiner* — Dana Ross
*Assistant Examiner* — Joe E Mills, Jr.
(74) *Attorney, Agent, or Firm* — Culpepper IP, PLLC; Kerry S. Culpepper

(57) ABSTRACT

A toasting device includes a housing, a plurality of heating spikes extending outwardly from an upper surface of the housing, and a controller electrically coupled to infrared heating sources in the plurality of heating spikes. The controller is configured to control electrical power to the plurality of heating spikes to thereby control temperature.

17 Claims, 12 Drawing Sheets

INFRARED TOASTING DEVICE

CROSS-REFERENCE TO RELATED APPLICATIONS

The present application claims the benefit of Provisional Application No. 62/124,614 filed on Dec. 23, 2014.

TECHNICAL FIELD

The technical field relates generally to devices for cooking food items and, more particularly, to an infrared toasting device for such cooking.

BACKGROUND

A conventional spike-style toasting device includes heating spikes disposed on an upper surface of a housing. Each of the heating spikes includes an internal heating element which heats the exterior surface of the spike via conduction. In operation, a food item such as, for example, bread for a hot dog or sausage, is placed on a heating spike to form a cavity in the food item and toast the interior portion.

Examples of conventional toasting devices include the "Sandwich Tool" described in U.S. Pat. No. 1,848,030 to Sibley, the "Bun Puncher and Toaster" described in U.S. Pat. No. 1,902,564 to Mabey, the "Bun Toaster" described in U.S. Pat. No. 2,648,275 to Thompson, the "Device for Toasting the Interior of Buns" described in U.S. Pat. No. 3,377,943 to Frank, the "Heating Apparatus for Bread and Filler Material" described in U.S. Pat. No. 3,635,146 to Jean-Pierre, the "Internal Bun Toaster" described in U.S. Pat. No. 3,965,808 to Chomette, and the "Bread Impaling Cooking Utensil" described in U.S. Pat. No. 7,339,136 to Schmanski, among others, the contents all of which are incorporated herein by reference.

SUMMARY

Several companies devise safety and sanitation standards for commercial equipment. Underwriters Laboratories (UL) is a safety consulting and certification company that provides safety-related certification, validation, testing, inspection, as well as other services to manufacturers, retailers, etc. American National Standards Institute (ANSI) is a private non-profit organization that oversees the development of voluntary consensus standards for products, services, processes, systems and personnel in the United States. NSF international is a global independent public health and environmental organization that provides product standards, product certification, as well as other services. ANSI standards are used by NSF. UL and NSF standards are currently accepted in all fifty states. Moreover, some government agencies require that UL and/or NSF standards be satisfied for commercial cooking equipment. Therefore, it is preferably that a toasting device satisfies UL and/or NSF standards.

In a conventional conduction-type toasting device, a long time may be required to raise the temperature of the heating spikes of the toasting device to a high temperature such as, for example, 475 degrees Fahrenheit for toasting the food item. Accordingly, the conduction-type toasting devices are often left turned on throughout the day after initially heating up, which wastes energy, and can present safety concerns due to excess heat within the cooking area. Moreover, if the heat is not dissipated from the continuously operating conduction-type toasting device, it can be transferred to the housing and overheat the internal electrical components, thereby shortening the operational life of the device components and presenting an unsafe operating condition.

An approach to dissipating heat is to include ventilation holes in the base of the housing as described in U.S. Pat. No. 3,635,146 to Jean-Pierre. However, this approach may be unacceptable under existing commercial sanitary standards because the holes can give vermin access to the interior of the device. Particularly, the ventilation holes may violate NSF/ANSI 4 standards entitled "Commercial Cooking, Rethermalization, and Powered Hot Holding and Transport Equipment" and UL 197 Standard for Commercial Electric Cooking Appliances.

Another approach to limit heat transfer from the spikes to the housing is to place the heating spikes on top of elevated rectangular boxes referred to here as "rails" which are fixed to a chassis of the housing. The rails include openings for dissipating heat before it is transferred to the housing. The bottom of the chassis also contains openings to vent heat. Placing the heating speaks on the rails can prevent damage to electrical components on the chassis from excessive heat. However, the rails can create inaccessible areas which are difficult to clean, thereby allowing build-up of crumbs and non-stick sprays from the spikes. Further, there can be an unacceptable gap where the rails attach to the chassis which also cannot be properly cleaned. Such a toasting device may not satisfy certain NSF standards and thereby not be accepted by UL.

In view of the above problems, as well as other concerns, an infrared toasting device for heating a plurality of food items according to the present disclosure includes a housing, a plurality of heating spikes and a plurality of spacers connected to base portions of the plurality of heating spikes, respectively. Each of the heating spikes includes an infrared heating source and a pointed portion extending outwardly from an upper surface of the housing for creating a cavity in a respective one of the plurality of food items. The heating spikes can be made of a glass or glass-like material.

Each of the plurality of spacers can be connected to an upper plate of the housing by first attachment members to thereby prevent direct contact between the plurality of heating spikes and the housing. The upper plate of the housing, the plurality of spacers, and the plurality of heating spikes define a food zone which contacts the plurality of food items. Each of the plurality of spacers is composed of a highly heat resistive material such as PTFE to substantially insulate the housing from heat generated from the respective heating spike.

The housing can include an aluminum bottom plate and a stainless steel chassis. Rather than including ventilation holes, the outer surfaces of the housing can be impermeable to prevent contamination of an interior of the housing.

The infrared toasting device can further include one or more thermal cutoff devices configured to shut off one or more infrared heating sources when a temperature associated with one or more of the plurality of heating spikes is greater than a predetermined limit.

A controller electrically coupled to the plurality of heating spikes is configured to control a duty cycle of power applied to the infrared heating sources to control the temperature. Alternatively, at least one of the plurality of heating spikes can include a thermocouple electrically coupled to the controller for measuring the temperature of the food items.

During operation, food items can be placed on the plurality of heating spikes of the toasting device to form the cavity having an opening at only one end in each of the food items. The controller can execute a programmable heating cycle to heat the food items to a predetermined temperature to thereby toast an interior surface of the cavities.

BRIEF DESCRIPTION OF THE DRAWINGS

The accompanying figures, in which like reference numerals refer to identical or functionally similar elements, together with the detailed description below are incorporated in and form part of the specification and serve to further illustrate various exemplary embodiments and explain various principles and advantages in accordance with the present invention.

DETAILED DESCRIPTION

In overview, the present disclosure concerns an infrared toasting device for food items such as bread for a hot dog or sausage referred to as a "bun". In the various embodiments discussed in the disclosure the term "bun" will be used here to refer to all types of bread. However, it should be noted that the toasting device is not limited to a bun, but can also be used to toast other food items. Further, toasting here can refer to, for example, browning, cooking, or generally heating the bun particularly or food item generally by exposure to heat.

The instant disclosure is provided to further explain in an enabling fashion the best modes of performing one or more embodiments of the toasting device. The use of relational terms such as first and second, top and bottom, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Figure 1:
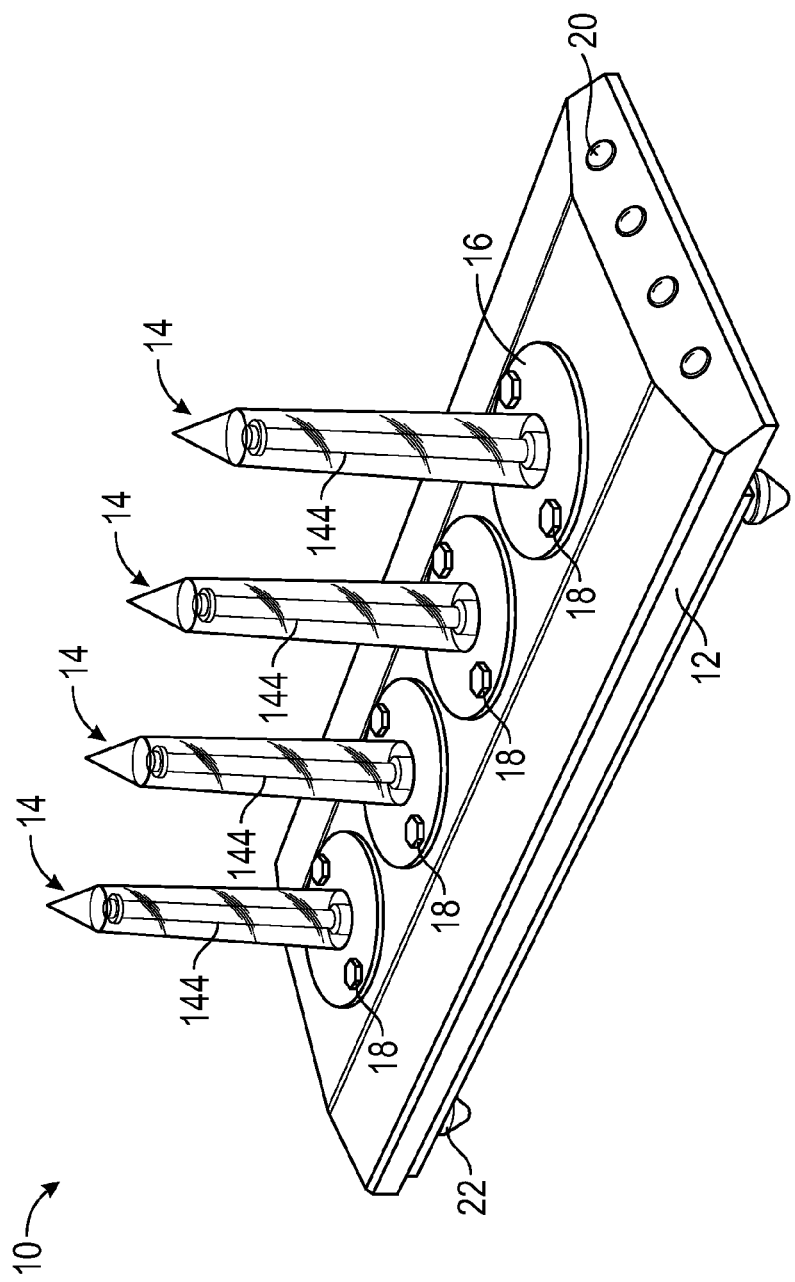
FIG. 1 is a perspective view of the toasting device according to an exemplary embodiment.
Figure 2A:
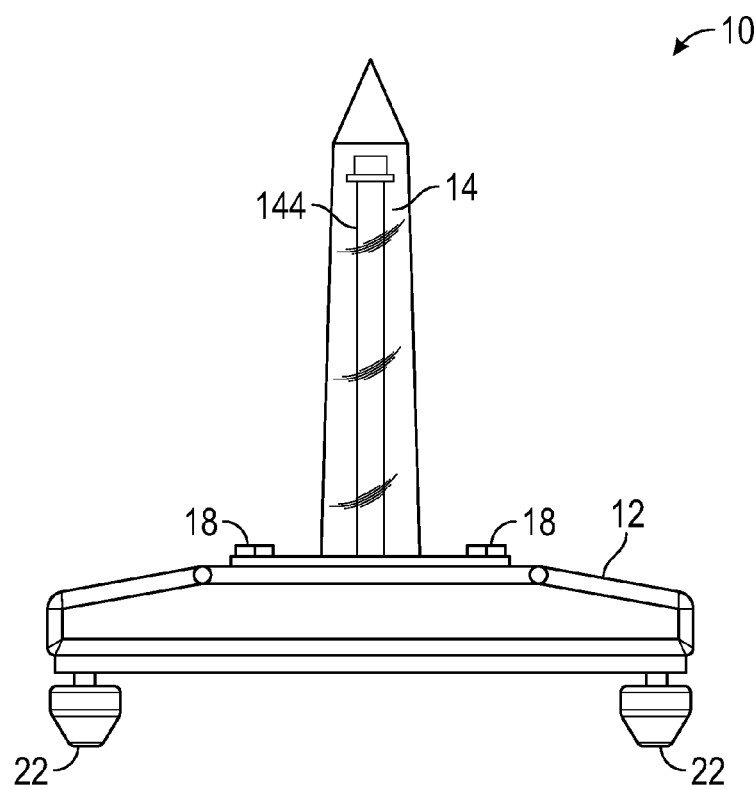
FIG. 2A is a side view of the toasting device.
Figure 2B:
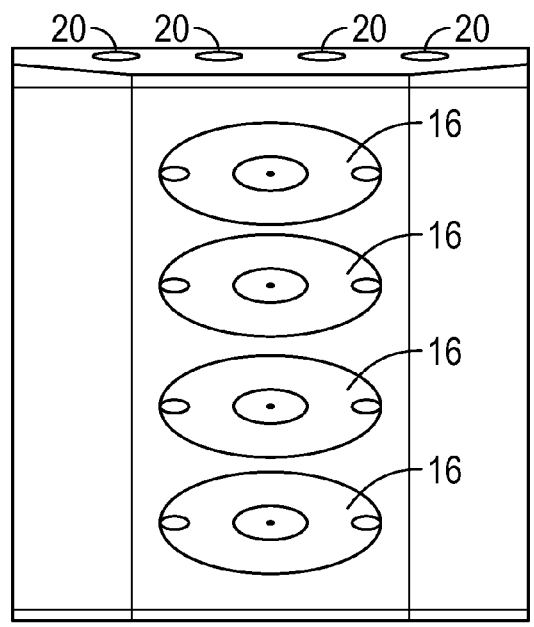
FIG. 2B is a top view of the toasting device.

Referring to FIG. 1, the toasting device 10 includes a housing 12 and a plurality of heating spikes 14 sitting on the housing 12 via a plurality of spacers 16. Each of the spacers 16 can be secured to the housing 12 by first attachment members 18 such as, for example, screws. The housing 12 can include a plurality of indicator lights 20, each of which lights when a corresponding heating spike 14 is heated, and four leg portions 22. In this exemplary configuration, the toasting device 10 includes four heating spikes 14 arranged in a row. However, the toasting device 10 is not limited to this arrangement. Particularly, other arrangements of the heating spikes 14 such as in a circle, square, grid or other geometrical figures are possible. Moreover, although head portions of the first attachment members 18 shown are not flush with the spacers 16 on the housing 12, the head portions can be flush with the housing 12 so that the upper surface can be cleaned more easily. The upper surface of the housing 12, the spacers 16, and the plurality of heating spikes 14 define a food zone which can contact food items to be toasted.

Figure 3:
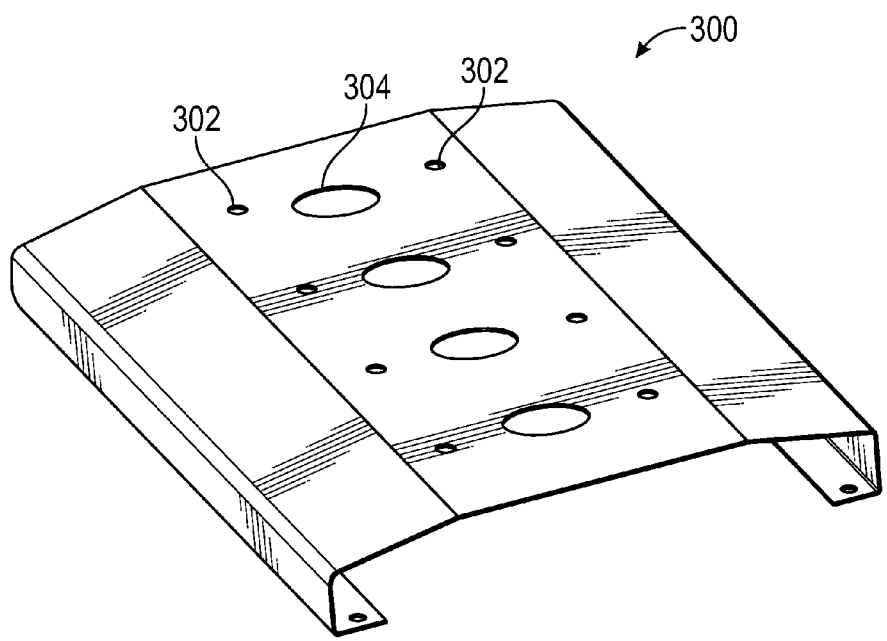
FIG. 3 is a perspective view of the chassis.
Figure 4A:
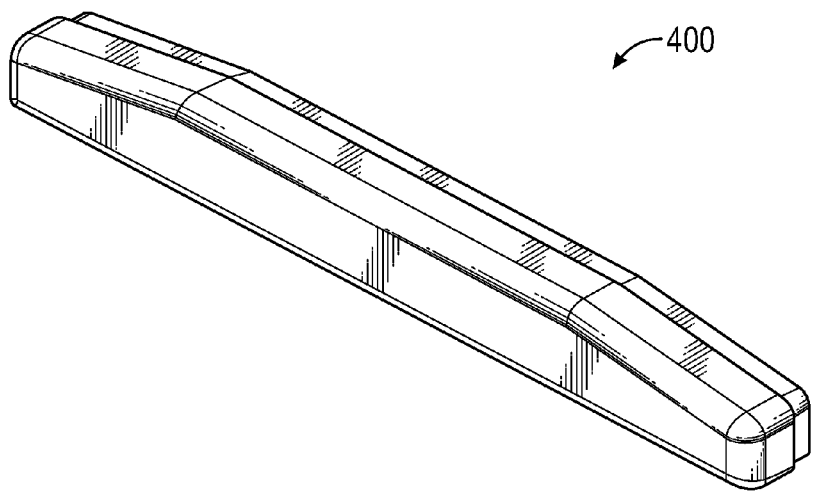
FIGS. 4A-4B are perspective views of the chassis face plate and the rear side plate.
Figure 4B:
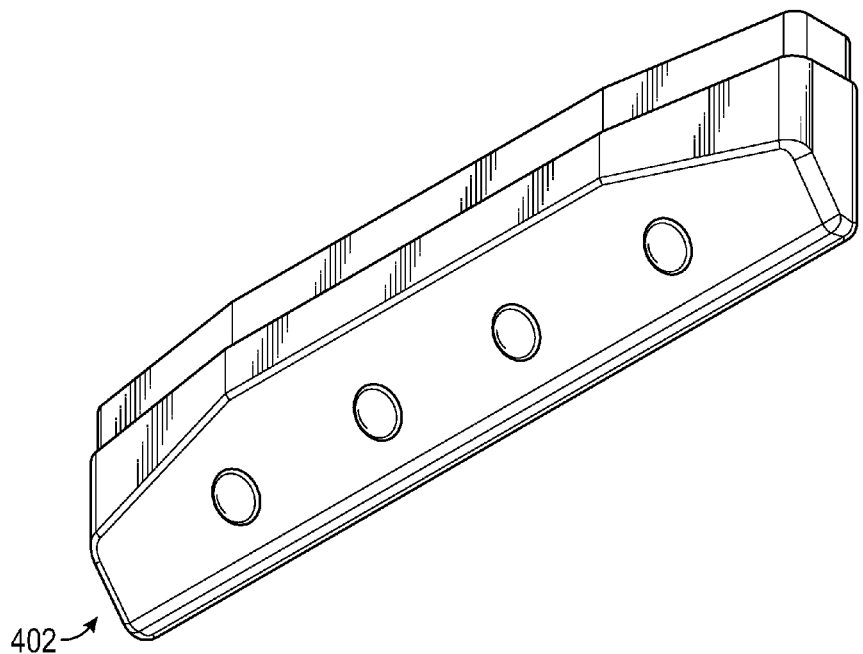
Figure 5:
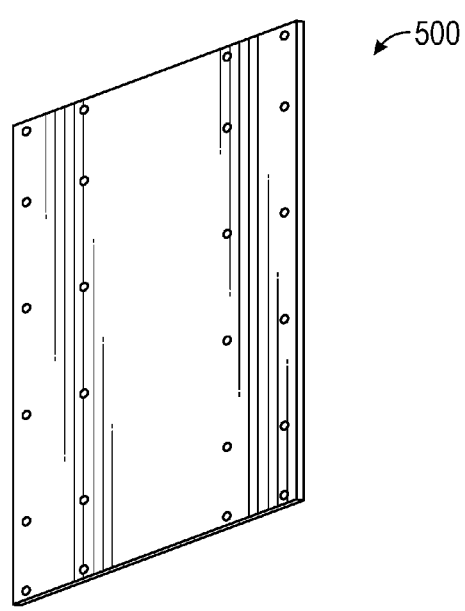
FIG. 5 is a top view of the chassis base.

Referring to FIGS. 3-5, the housing 12 can include a chassis 300, a chassis face plate 400 (FIG. 4A), a rear side plate 402 (FIG. 4B) and a bottom plate 500 (FIG. 5). The chassis 300 includes a center through-hole 304 providing a passage for feeding a wire connecting the infrared heating source 144 and/or thermocouple to electrical portions in the housing 12, and a plurality of first through-holes 302 for receiving the attachment members 18. Because the chassis 300 is within the food zone, it preferably should be composed of any commercially certified metal such as, for example, stainless steel or aluminum that complies with commercial standards such as ANSI/NSF 51. Preferably, the bottom plate 500 does not include ventilation holes. Further, attachment members such as screws will be inserted in all holes to make the bottom plate 500 impermeable and prevent contamination of an interior of the housing.

The housing 12 can include a user interface 1302 such as a digital temperature control panel for a controller 1304 (see FIG. 13A) which is electrically coupled to the plurality of heating spikes 14 by, for example oven-grade wiring. Particularly, the control panel can include a digital display for displaying a temperature associated with the toasting device 10 and buttons for adjusting the temperature. The controller 1304 can adjust temperature by controlling a duty cycle of the electrical power (current or voltage) to infrared heat sources in the heating spikes 14.

Figure 6:
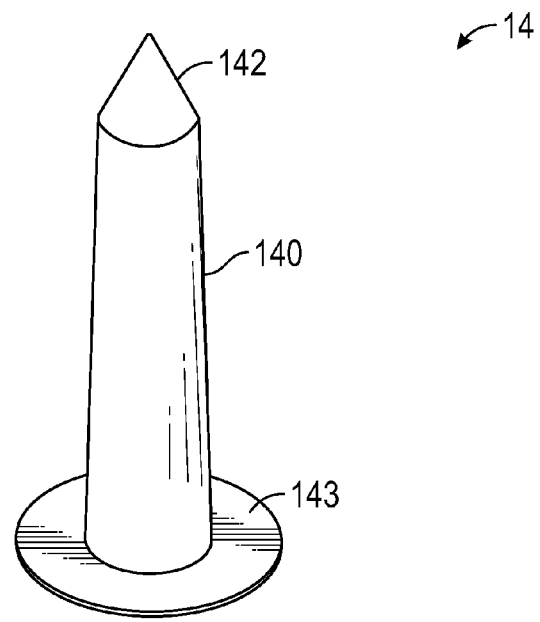
FIG. 6 is a perspective view of the heating spike.

Referring to FIG. 6, the plurality of heating spikes 14 will be discussed. Each of the heating spikes 14 extends outwardly from the upper surface on the chassis 300 of the housing 12 and includes a tapered portion 140, a pointed portion 142 and a base portion 143. When a bun is placed on the pointed portion 142, the pointed portion 142 can create a cavity in the bun. Generally, a height and width of the spikes 14 is not limited, but can be decided based upon the typical food item to be toasted.

Each of the heating spikes 14 shown in FIG. 1 is preferably made of a glass material such as, for example borosilicate glass, Pyrex (registered trademark) or glass-like products which comply with commercial food-zone standards such as ANSI/NSF 51. The use of glass material has the advantage of eliminating the need to lubricate the heating spikes 14 with non-stick spray, thereby keeping the toasting device 10 cleaner. Each of the heating spikes 14 can include a light-emitting diode for emitting light while activated.

Alternatively, each of the heating spikes 14 can be made from a food-grade metal such as, for example, stainless steel.

Particularly, a metal rod can be machined on its outer surface to form the tapered and pointed portions 140, 142. A chamber in the heating spikes 14 for the infrared heating source 144 can be formed by drilling the metal rod to make the spike as thin as possible.

Returning to FIG. 1, each of the heating spikes 14 includes an infrared heating source 144 mounted vertically on the housing 12 via the spacer 16. The infrared heating source 144 can include a wire filament contained within a quartz tube coated with materials (such as gold) to increase the amount of heat transferred to the buns. The wire filament can be made of one or more of tungsten, carbon, iron, alloys, chromium and aluminum. The wire filament is coiled or otherwise shaped in a manner that creates more surface space. Electric power is applied to the wire filament which causes it to heat. The heat from the hot tube is then transferred to the cooler heating spike 14 and/or bun through electromagnetic radiation at a predetermined wavelength selected to optimize the toasting process. Preferably, a peak wavelength of the infrared heating source 144 matches the peak absorption of the buns.

At least one of the heating spikes 14 can further include a thermocouple for temperature measuring and oven-grade wiring (not shown) connecting the infrared heating source 144 and the thermocouple to the other electrical portions in the housing 12.

Figure 7A:
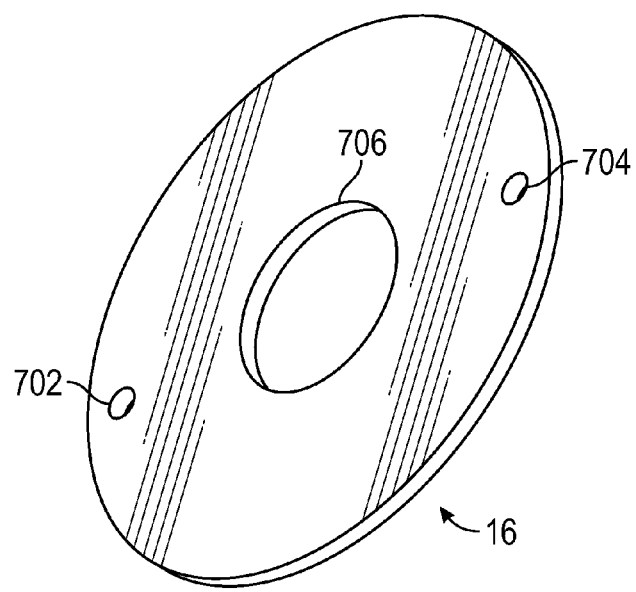
FIG. 7A is a perspective view of a spacer.

Referring to FIG. 7A, each of the plurality of spacers 16 is connected to the base portions 143 of the plurality of heating spikes 14 and to the upper surface of the housing 12 to be external to the housing 12. The spacer 16 can be composed of a highly heat resistive and food-grade material to substantially insulate the housing 12 from heat associated with the heating spike 14. For example, the spacers 16 can made from virgin polytetrafluoroethylene (PTFE), food-grade ceramics, metal, glass, porcelain, enamel, lava, plastics similar to PFTE, Kevlar or fiberglass. Each of the plurality of spacers 16 can include a plurality of first through-holes 702, 704 for receiving the attachment members 18 and a center through-hole 706 providing a passage for feeding the wire connecting the infrared heating source 144 and/or thermocouple to the electrical portion in housing 12.

Figure 7B:
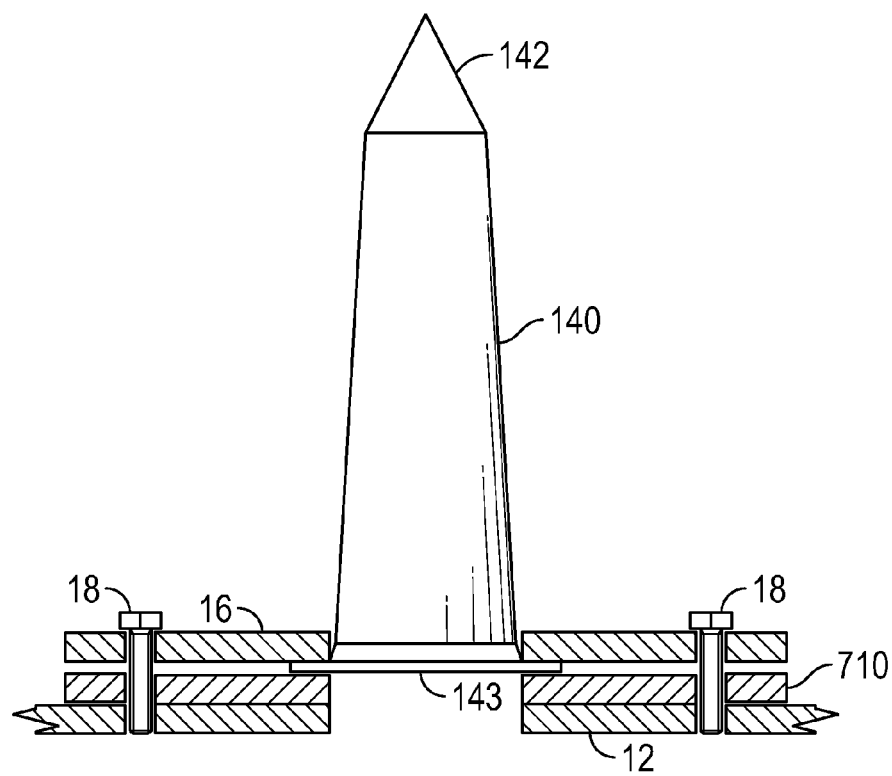
FIGS. 7B-7C are cross-sectional views of the heating spike secured to the housing via a plurality of spacers according to first and second exemplary embodiments.
Figure 7C:
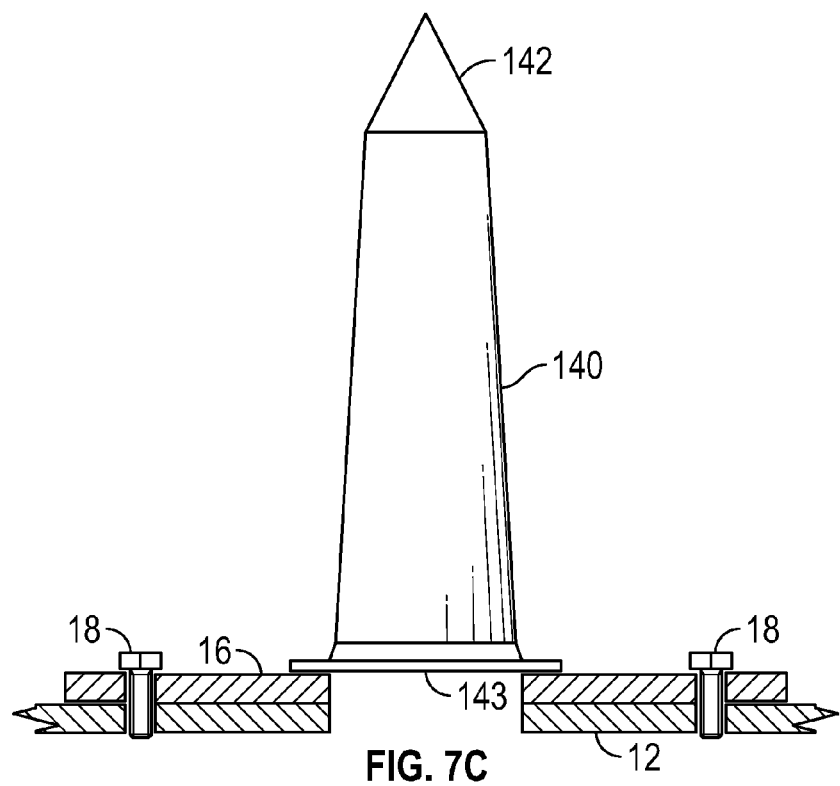

Referring to FIG. 7B, according to an exemplary embodiment, the heating spike 14 can be secured to the housing 12 by sandwiching the base portion 143 between first and second spacers 16, 710. Both spacers 16, 710 are similar to the spacer 16 shown in FIG. 7A and are secured to the housing 12 by attachment members 18. Referring to FIG. 7C, according to another exemplary embodiment, the base portion 143 of the heating spike can be secured to a top portion of the spacer 16 by an adhesive. Placing the spacer (s) between the housing 12 and the heating spike 14 allows expansion and contraction to occur without damage or stress or breakage.

Figure 8:
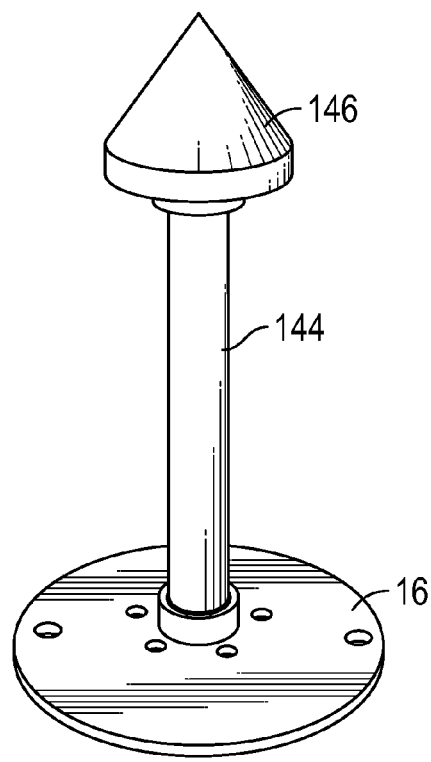
FIG. 8 is a perspective view of an infrared heating source.

Referring to FIG. 8, the heating spike 14 according to another embodiment includes a pointed portion 146 affixed to the top of the tube of the infrared heating source 144. The bottom of the infrared heating source 144 is fixed to the spacer 16. The pointed portion 146 is made of one of ceramics, metal, glass, porcelain, enamel, lava and polytetrafluoroethylene (PTFE) and other plastics similar to PTFE.

Figure 9:
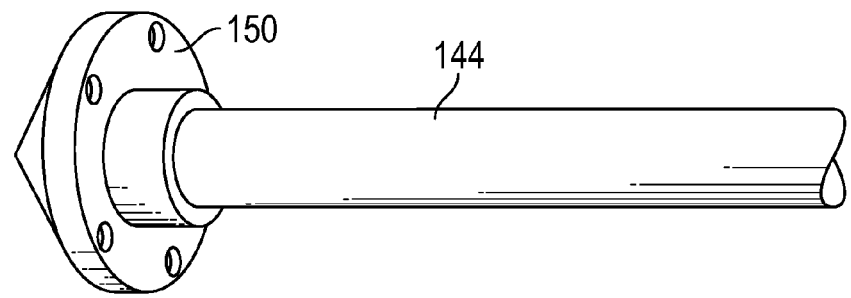
FIG. 9 is another perspective view of a partial portion of the infrared heating source.
Figure 10:
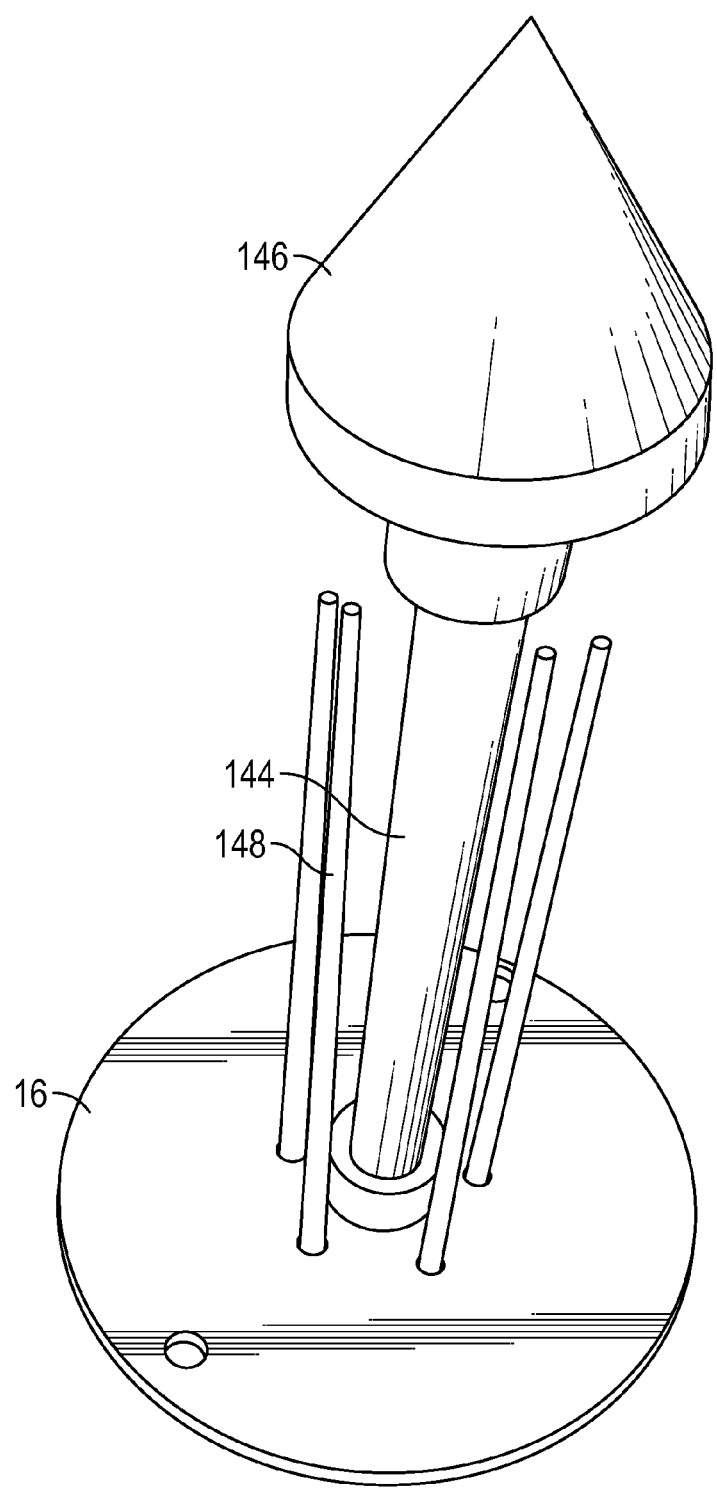
FIGS. 10-11 are perspective views of the heating spike according to another embodiment.
Figure 11:
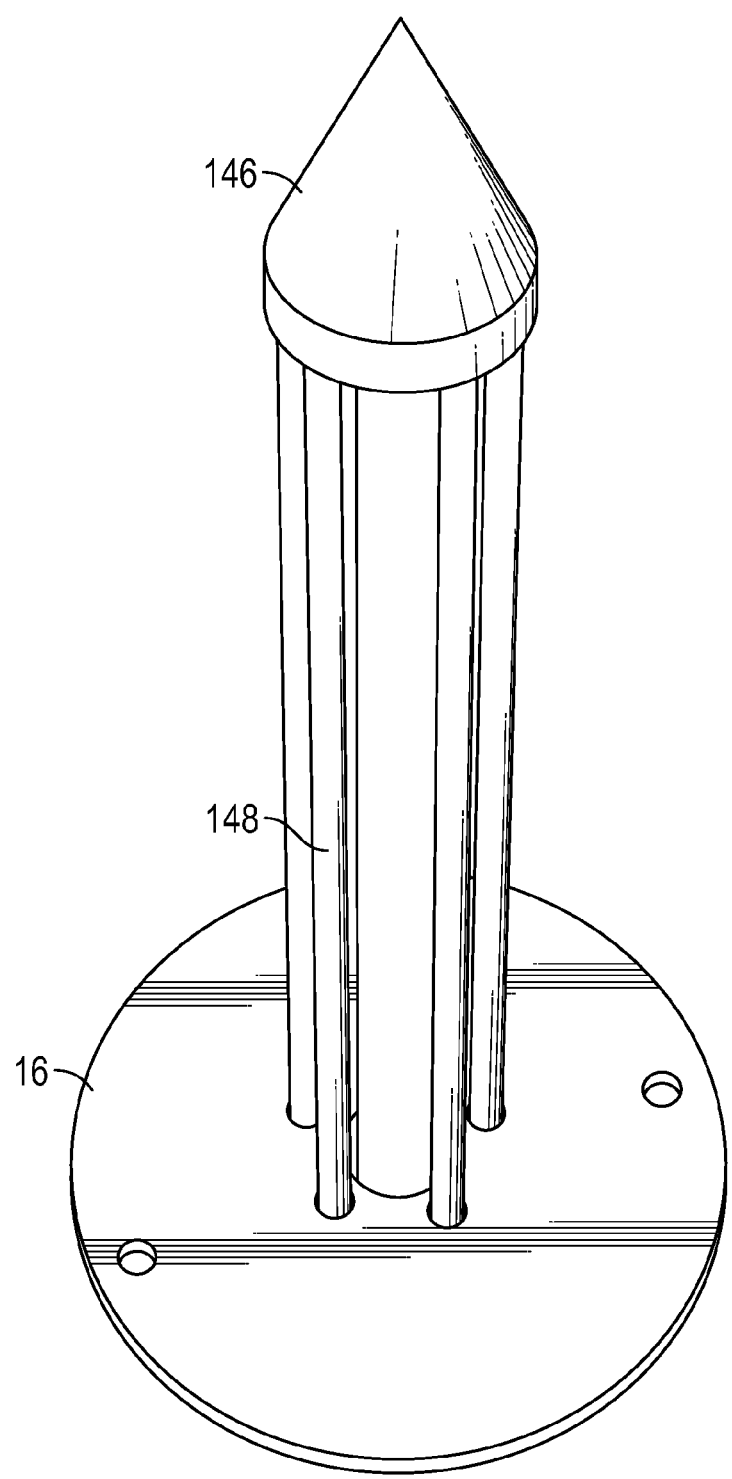

Referring to FIGS. 9-11, the heating spike 14 can includes a plurality of metal rods 148 extending from the spacer 16 to the pointed portion 146 and surrounding the tube. Particularly, each of the pointed portion 146 and the spacer 16 can include receiving portions (holes) 150 for receiving the metal rods 148. The metal rods 148 form a cage around the infrared heating source 144 to aid in the placement of the bun over the infrared heating source 144. The cage could be supplemented or replaced by an outer tube made from food-grade material covering the plurality of metal rods.

Figure 12:
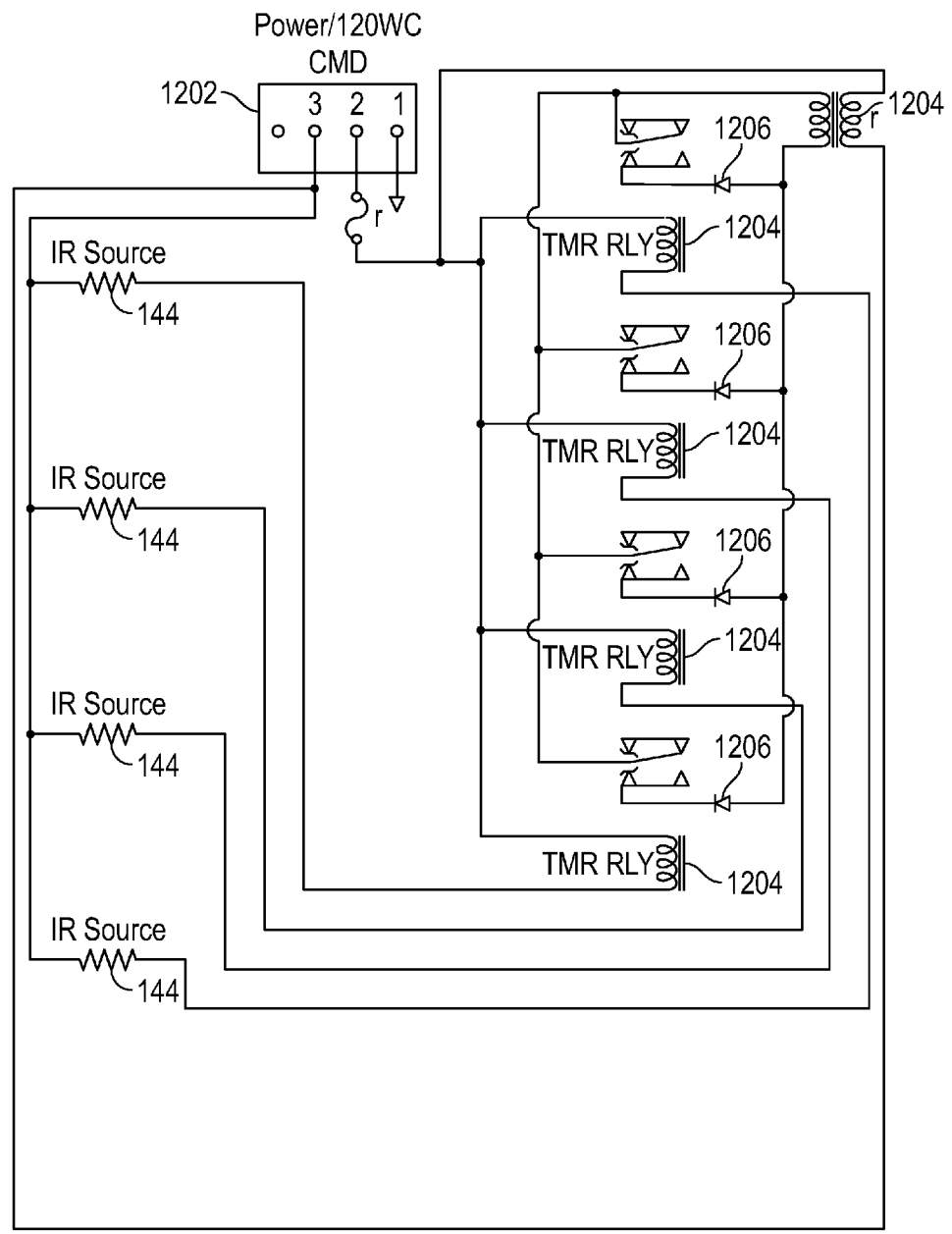
FIG. 12 is a block diagram illustrating an electrical circuit of the toasting device.

Referring to FIG. 12, an exemplary electrical circuit configuration of the toasting device 10 will be discussed. A power supply 1202 provides electrical power to the infrared heating sources 144 of the spikes via relays 1204. Grounding can be provided by an internal grounding connection (not shown). The infrared heating sources 144 are connected together in parallel row-wise. Thermal cutoff devices 1206 are coupled to the infrared heating sources 144, respectively. Potential overheating of the heating spikes and other electrical malfunctions present safety issues when using the toasting device, particularly in heavy-duty commercial use. The thermal cutoff devices 1206 can stop power supply and thus shut-off the respective infrared heating source 144 when, for example, a temperature associated with the heating spike and/or the bun is greater than a predetermined limit and/or when a malfunction occurs.

Figure 13A:
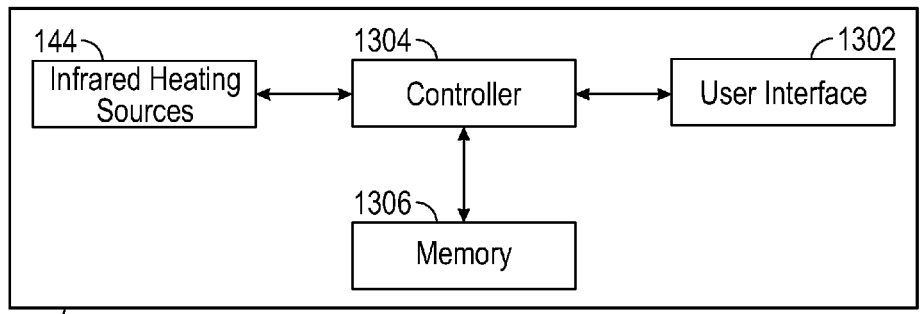
FIG. 13A is a block diagram illustrating exemplary portions of the toasting device.

Referring to FIG. 13A, the infrared toasting device 10 can include a user interface 1302, a controller 1304 coupled to the infrared heating sources 144, and a memory portion 1306. The user interface 1302 can be a CapSense (registered trademark) touch pad for permitting a user to input a programmable heating cycle into the memory portion 1306. Alternatively, the user interface 1302 can include mechanical portions such as a control knob and timers for manually creating a heating cycle.

The memory portion 1306 can be one or a combination of a variety of types of memory such as random access memory (RAM), read only memory (ROM), flash memory, dynamic RAM (DRAM) or the like. Generally, the controller 1304 can be integrated circuits (ICs), controller executing computer instructions (software) stored in the memory 1306, and/or application specific ICs containing a processor core, memory and programmable input/output peripherals. It is expected that one of ordinary skill, notwithstanding possibly significant effort and many design choices motivated by, for example, available time, current technology, and economic considerations, when guided by the concepts and principles disclosed herein (such as in FIG. 15) will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Figure 14:
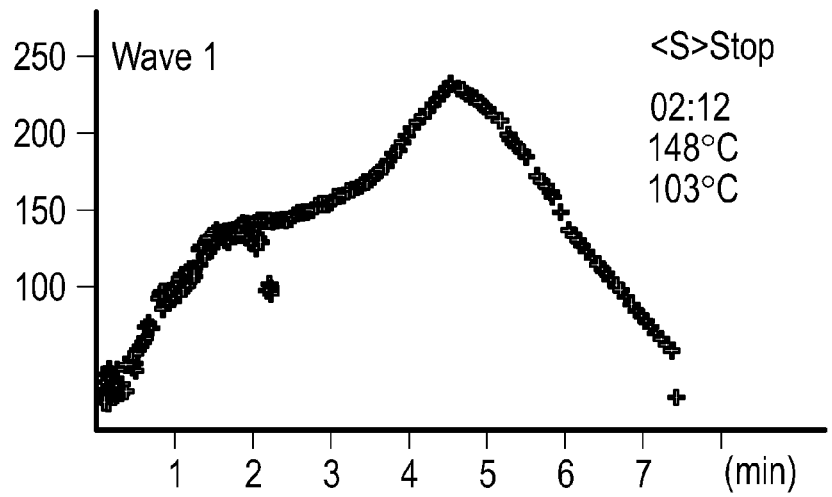
FIG. 14 is a diagram illustrating an exemplary heating profile associated with the toasting device.

The memory portion 1306 can store one or more programmable heating cycles, which also can be referred to as "heating profiles" or "heat curves" to control the operation of the infrared heating sources 144. Particularly, the programs include instructions for configuring the controller 1304 to control electrical power flow to the infrared heating sources 144 for a first predetermined time period until the infrared heating sources 144 bring the buns to a predetermined heating temperature, and then maintains the power flow to the infrared heating sources 144 so the buns remain at the predetermined heating temperature for a second predetermined time period. The first and second predetermined time periods and the predetermined heating temperature can be adjusted in accordance with an ambient temperature, ambient humidity, type of food item, and a selected toasting level. The controller 1304 turns off the infrared heating sources 144 at the end of the heating cycle. An example heating cycle is shown in FIG. 14.

Figure 13B:
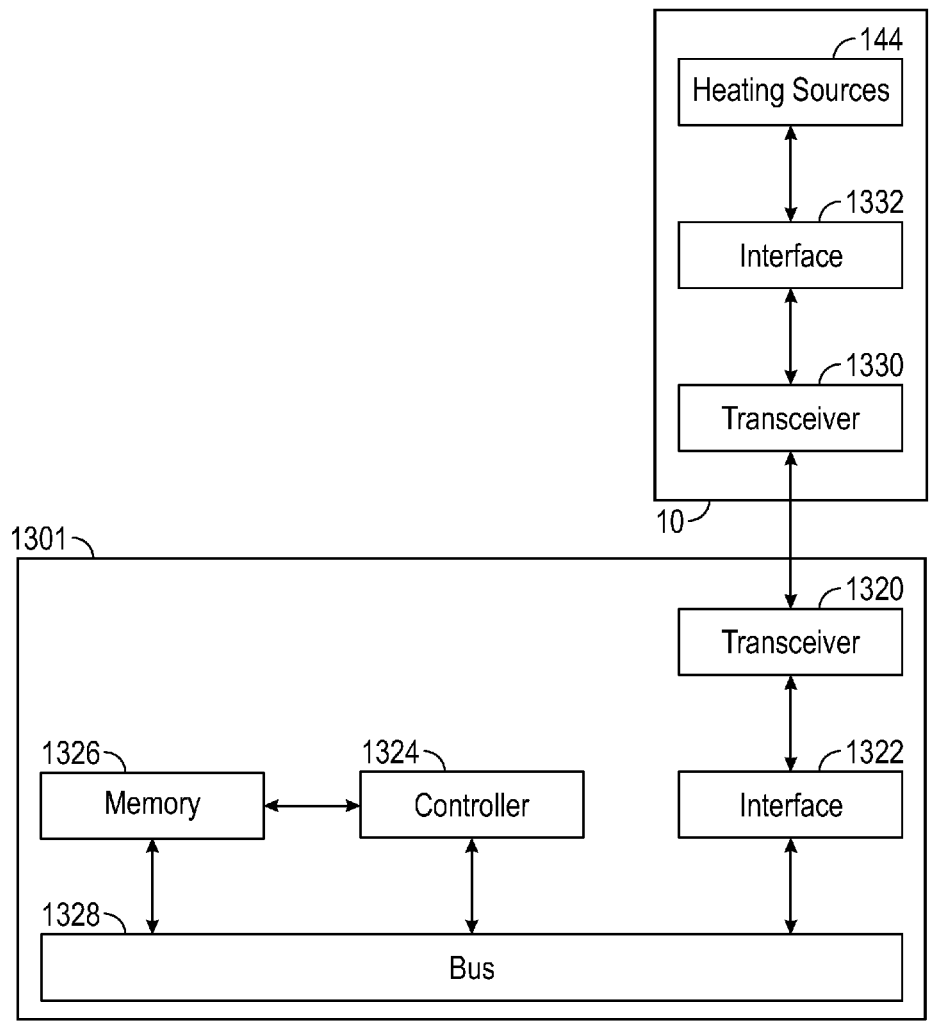
FIG. 13B is a block diagram illustrating exemplary portions of a computing device for controlling the infrared heating sources of the toasting device and exemplary portions of the toasting device.

Referring to FIG. 13B, in another embodiment, the infrared heating sources 144 of the toasting device 10 can be controlled by an external control device 1301. The control device 1301 can be connected to the infrared heating sources 144 of the heating spikes 14 via a direct connection such as a wired or wireless connection or even an indirect connection such as a connection through the Internet, local area network, wide area network, communication network, etc. The control device 1301 can include a transceiver 1320, an interface 1322, a controller 1324, a memory portion 1326 and a common bus 1328.

Referencing the Open Systems Interconnection reference model (OSI model), the transceiver 1320 provides the physical layer functions such as modulating packet bits into electromagnetic waves to be transmitted and demodulating received waves into packet bits to be processed by higher layers. The transceiver 1320 can include radio technology circuitry such as, for example, ZigBee, Bluetooth and WiFi. The transceiver 1320 may also include Ethernet and a USB connection.

The interface 1322 can provide the data link layer and network layer functions such as formatting the packet bits to an appropriate format for transmission by the transceiver 1320 or received packet bits into an appropriate format for processing by the controller 1324. For example, the interface 1322 can be configured in accordance with the 802.11 media access control (MAC) protocol and the TCP/IP protocol. Although not shown here for simplicity, it should be noted that both the interface 1322 and the transceiver 1320 may be implemented by a network interface consisting of a few integrated circuits.

The controller 1324 and memory portion 1326 can be similar to the controller 1304 and memory portion 1306 shown in FIG. 13A. The bus 1328 is a common bus for providing internal data communication.

The toasting device 10 can also include a transceiver 1330 and interface 1332 similarly to those of the control device 1301 to receive the control signals from the control device 1301 as well as sending data indicative of temperature to the control device 1301. The interface 1332 can be configured to control electrical power to the infrared heat sources to thereby control temperature based upon the received control signals. Further, the toasting device 10 can also include a controller 1304 similar to as shown in FIG. 13A.

Figure 15:
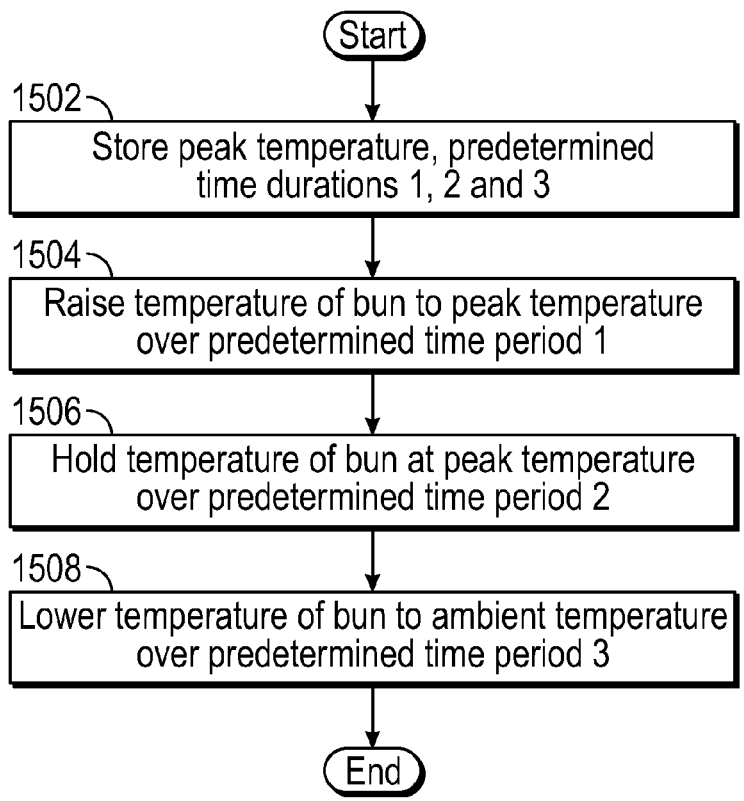
FIG. 15 is a flow diagram illustrating exemplary operation of the toasting device.

Referring to FIG. 15, operations by the controller 1304 (and/or the control device 1301) to perform an exemplary heating cycle will be discussed. At 1502, a user inputs the desired peak temperature of the bun, and first, second and third predetermined time durations (variables). For the toasting device 10 shown in FIG. 13A, the user interface 1302 can be manipulated to store the peak temperature and predetermined time duration in the memory 1306. Alternatively, the user can input the variables at the control device 1301 shown in FIG. 13B, and the variables can be transmitted from the transceiver 1320 to the toasting device 10 via a connection to a network.

At 1504, the controller 1304 adjusts power flow to the infrared heating sources 144 to raise temperature of the bun to a peak temperature over a first predetermined time period. Particularly, the controller 1304 can send appropriate current to the infrared heating sources 144 to generate electromagnetic radiation at a predetermined wavelength. The temperature of the bun reaches peak temperature by absorbing the radiation. For example, the heating cycle could start at ambient temperature and ramp up to 450 degrees F. over a 45 second period.

At 1506, the controller 1304 maintains the temperature of the bun at peak temperature over a second predetermined time period. Particularly, the controller 1304 can send necessary current to the infrared heating sources 144. For example, the heating cycle could hold the temperature of the infrared heating sources 144 at 450 degrees F. over a 30 second period.

At 1508, the controller 1304 lowers the temperature of bun to ambient temperature over a third predetermined time period. Particularly, the controller 1304 can stop or lower current flow to the infrared heating sources 144. For example, the heating cycle could ramp down to ambient temperature over a 45 second period.

During operation, food items (not shown) are placed on the plurality of heating spikes 14 of the toasting device 10 to form a cavity having an opening at only one end in each of the plurality of food items. Particularly, the controller 1304 executes a programmable heating cycle to control electrical power flow to the infrared heating sources 144 and thus heat the food items on the heating spikes 14 to a predetermined temperature to thereby toast an interior surface of the cavities.

One of the advantages of the infrared toasting device 10 is that the infrared heating sources 144 can be turned off when not in use. Particularly, in conduction-type toasting devices, a long time may be required to raise the temperature of the heating spikes of the toasting device. Therefore, conduction-type toasting devices are often left turned on throughout the day after initially heating up, which wastes energy, and can present safety concerns due to excess heat within the cooking area. The programmable infrared toasting device 10 eliminates these problems. Moreover, the infrared heating process is energy efficient and creates very little unwanted heat. Therefore, in comparison to the conduction-type toasting device, the programmable infrared toasting device 10 is safer to use and has a longer operational life.

The toasting device 10 is not limited to the above-described embodiments. For example, the number and/or size of the through-holes 702, 704, 706 of the spacer 700 may be different. Further, the height (thickness) and diameter of the spacer may be different. Moreover, the manner by which the spacer 700 is connected to the heating spike 14 and, the housing 10 may be different. For example, the number of attachment members may be different. Further, more than one spacer 700 can be disposed in a stacked arrangement between the heating spike 14 and the housing 12.

Various combinations of the above embodiments and other embodiments will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A toasting device for heating a food item, comprising:
a housing;
a heating spike including a pointed portion extending outwardly in a direction opposite from an upper surface of the housing for creating a cavity in the food item, a base portion, and an infrared heating source; and
a controller electrically coupled to the infrared heating source, the controller configured to control a duty cycle of electrical power flow to the infrared heat source, wherein the infrared heating source heats the food item through electromagnetic radiation at a predetermined wavelength, wherein the infrared heating source comprises a wire filament contained within a tube, and wherein the heating spike further includes a plurality of metal rods extending from the base portion to the pointed portion and surrounding the tube.

2. The toasting device of claim 1, wherein the wire filament is made of one of carbon, iron, alloys, chromium and aluminum.

3. The toasting device of claim 1, wherein the tube is a quartz tube coated with gold.

4. The toasting device of claim 1, wherein the heating spike is made of a glass material.

5. The toasting device of claim 1, further comprising an outer tube covering the plurality of metal rods.

6. The toasting device of claim 1, further comprising a spacer between a base portion of the heating spike and an upper surface of the housing, the spacer made of a heat-resistant and food-grade material.

7. The toasting device of claim 1, wherein the spacer is made of one of ceramics, metal, porcelain, enamel, lava, and virgin PTFE, and is attached to the upper surface of the housing by first and second attachment members, and wherein the heating spike is made of a glass material.

8. The toasting device of claim 1, further comprising a memory portion coupled to the controller, the memory portion including instructions for configuring the controller to execute a programmable heating cycle in which the controller allows electrical power to flow to the infrared heating source for a first predetermined time period until the food item reaches a predetermined heating temperature, and then maintains the food item at the predetermined heating temperature for a second predetermined time period.

9. The toasting device of claim 8, further comprising a user interface for permitting a user to input the programmable heating cycle into the memory portion.

10. The toasting device of claim 8, wherein the first and second predetermined time periods and the predetermined heating temperature are adjusted in accordance with an ambient temperature, ambient humidity, type of food item, and a selected toasting level.

11. The toasting device of claim 1, further comprising an interface electrically coupled to the controller, the interface configured to receive control signals from an external control device, wherein the controller is further configured to control the duty cycle based upon control signals received from the external control device.

12. A toasting device for heating a food item, comprising:
a housing;
a heating spike including a pointed portion extending outwardly in a direction opposite from an upper surface of the housing for creating a cavity in the food item, a base portion, and an infrared heating source for heating the food item through electromagnetic radiation at a predetermined wavelength;
a spacer between a base portion of the heating spike and an upper surface of the housing, the spacer made of a heat-resistant and food-grade material; and
a controller electrically coupled to the infrared heating source, the controller configured to control a duty cycle of electrical power flow to the infrared heat source,
wherein the infrared heating source comprises a wire filament contained within a tube, the wire filament is made of one of carbon, iron, alloys, chromium and aluminum, and
the heating spike further includes a plurality of metal rods extending from the base portion to the pointed portion and surrounding the tube.

13. The toasting device of claim 12, wherein the heating spike is made of a glass material.

14. The toasting device of claim 12, wherein:
the pointed portion is made of one of ceramics, metal, glass, porcelain, enamel and polytetrafluoroethylene (PTFE).

15. A toasting device for heating a food item, comprising:
a housing;
a heating spike including a pointed portion extending outwardly in a direction opposite from an upper surface of the housing for creating a cavity in the food item, a base portion, and an infrared heating source;
a spacer attached to the upper surface of the housing; and
an interface electrically coupled to the infrared heating source, the interface configured to control electrical power to the infrared heat source to thereby control temperature of the food item based upon control signals received from an external control device,
wherein the infrared heating source heats the food item through electromagnetic radiation at a predetermined wavelength, and
the heating spike further includes a plurality of metal rods extending from the spacer to the pointed portion and surrounding the infrared heating source.

16. The toasting device of claim 15,
wherein:
the pointed portion is made of one of ceramics, metal, glass, porcelain, enamel and polytetrafluoroethylene (PTFE).

17. The toasting device of claim 15, wherein the heating spike is made of a glass material.

* * * * *